United States Patent [19]

Bergsma

[11] Patent Number: 4,545,673

[45] Date of Patent: Oct. 8, 1985

[54] PHOTOGRAPHIC MODIFIER METHOD AND APPARATUS FOR GRAPHICS AND THE LIKE

[76] Inventor: Calvin D. Bergsma, 1134 Baldwin Ave., Jenison, Mich. 49428

[21] Appl. No.: 512,402

[22] Filed: Jul. 8, 1983

[51] Int. Cl.$^4$ ............................................. G03B 27/68
[52] U.S. Cl. ...................................................... 355/52
[58] Field of Search ................................................ 355/52

[56] References Cited

U.S. PATENT DOCUMENTS 3,767,301  10/1973  Solo ........................................ 355/52
4,008,959  2/1977  Parsons ................................... 355/52
4,390,272  6/1983  Anderson ................................ 355/52

Primary Examiner—Monroe H. Hayes
Attorney, Agent, or Firm—Price, Heneveld, Huizenga & Cooper

[57] ABSTRACT

A photographic modifier and method for photographically modifying graphics and the like. A first transparent support which carries an image is overlaid on one side by a second transparent support which carries a photosensitive material. A light housing containing a light is movable across the first and second supports on the other side of the first support for exposing the image onto the photosensitive material. One of the first or second supports is movable simultaneously with the light housing to create a modification of the image on the photosensitive material as the light exposes the image thereon.

20 Claims, 9 Drawing Figures

U.S. Patent   Oct. 8, 1985   Sheet 2 of 2   4,545,673
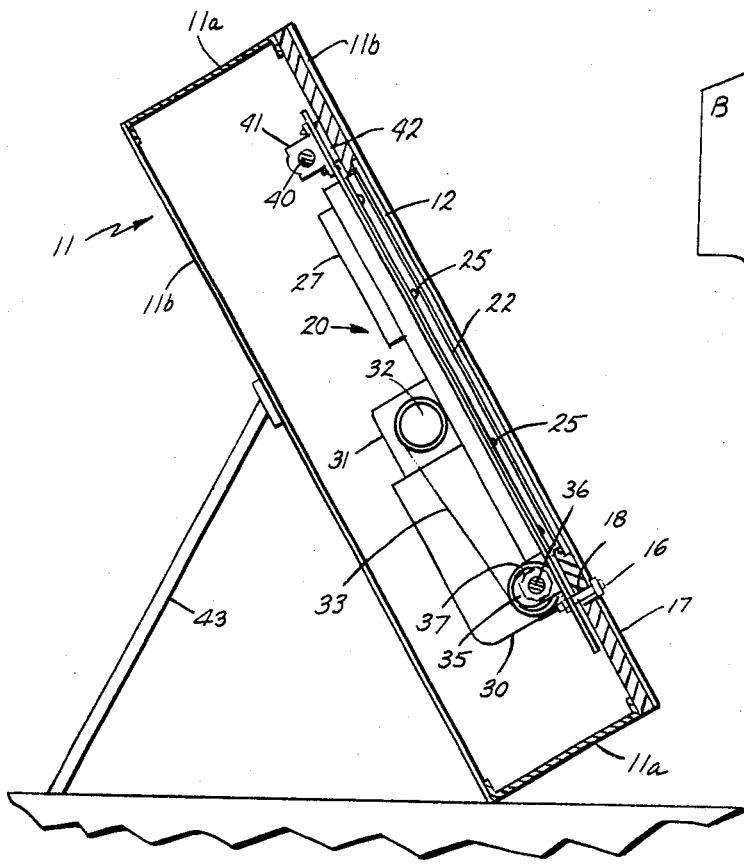
Fig. 3.
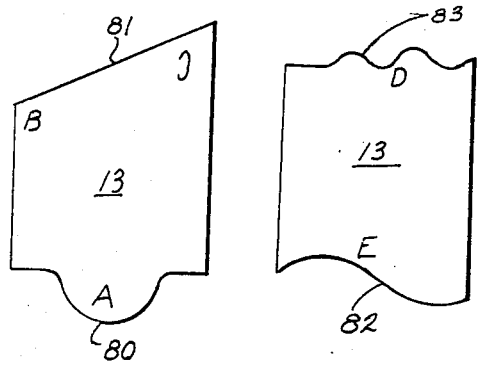
Fig. 6.
9A = WORDBENDER
5C = WORDBENDER
13C = WORDBENDER
ORIGINAL WORDBENDER
Fig. 8.
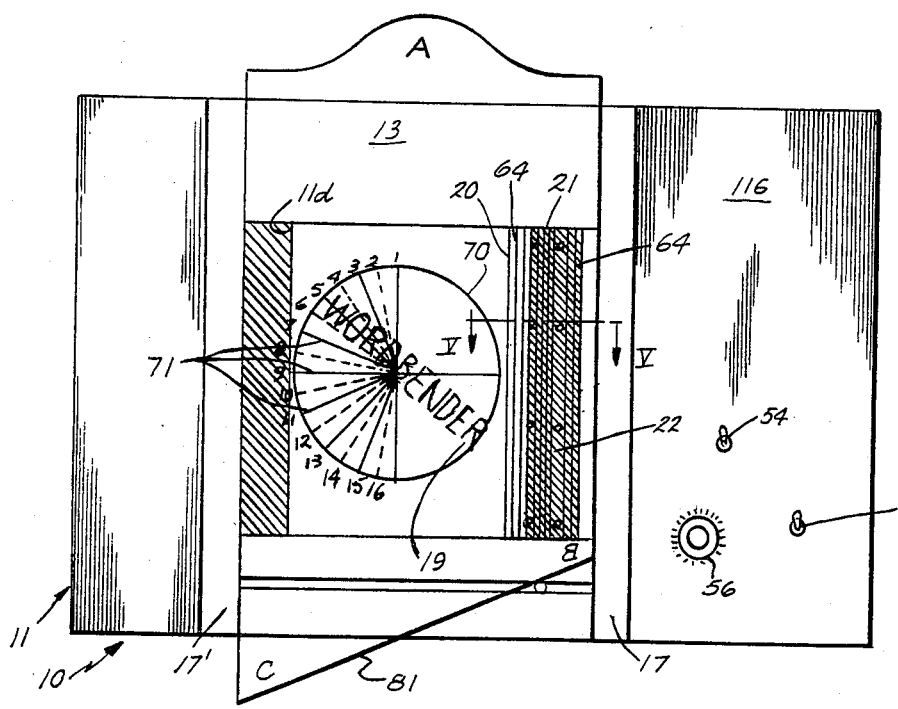
Fig. 4.

PHOTOGRAPHIC MODIFIER METHOD AND APPARATUS FOR GRAPHICS AND THE LIKE

BACKGROUND OF THE INVENTION

The present invention relates to a method and device in which images from an original print are photographically modified and captured on photosensitive material from which reproductions of the distortions can be made.

Many devices have been suggested for producing photographic modifiers of graphic materials. However, most of these devices are very cumbersome, complicated, relatively expensive, difficult to operate, or are very limited in capabilities. Accordingly, to my knowledge, although a long felt need has existed for years for a device that will satisfy the needs of the graphic industry, no suitable device has ever been conceived and developed.

One such prior art device used at least sparingly by the graphic industry is disclosed in U.S. Pat. No. 3,767,301 issued on Oct. 23, 1973, to Solo entitled PHOTOGRAPHIC MODIFIER. Solo's image distortion device includes a cabinet having a door with a longitudinal slit therethrough. A light mounted outside the cabinet far from the slit in the cabinet door shines through the slit onto two transparent carriers. Both carriers are movable with respect to one another by a cam, and both are positioned in overlying relationship to one another. The first carrier—the one closer to the slit—carries the negative; the second carrier carries a photosensitive material. As both carriers move relative to the slit and the first carrier moves relative to the second, the image on the first carrier is captured on the photosensitive material of the second and is modified by the relative movement.

Solo's device, like many other devices, requires a relatively large room for operation or is made physically larger by having to employ a light source external from the cabinet on which the carriers are mounted and the controls are housed.

One device having an internal light source is disclosed in U.S. Pat. No. 3,967,898 issued on July 6, 1976, to Klann entitled OPTICAL DISTORTION DEVICE. Klann discloses an image modifying device having a stationary light source in a cabinet. The light source shines through a slit through the top surface of the cabinet. Two carrier sheets are fed on rolls past the slit on the outside of the cabinet. The first carrier carries an image thereon and moves relative to the second carrier which carries a photosensitive material thereon. The relative movement of the two carriers modifies the image projected from the first sheet onto the second sheet. Means are provided to reflect light from the source through the slit.

There are a variety of other more complicated optical modifying devices than either of the Klann or Solo devices. However, as indicated above they either have the inconvenience of having an externally mounted light source increasing the space requirements for operation of the device (as is the case with the Solo Device), or such devices lack versatility as is the case in the Klann device.

SUMMARY OF THE INVENTION

The present invention provides a novel photographic modifier method and apparatus which makes possible an extremely compact, simple and portable device which is easy to manufacture and use. The present method and apparatus affords considerable flexibility in the types of modifications which can be produced. A non-curved image can be modified into a variety of curved, angled, etc., configurations. An image can also either be extended in length while lowered in height or condensed in length and raised in height. Other types of modifications are possible as well, such as italicizing.

The method and apparatus of the present invention comprises supporting an image on one side of which is supported a photosensitive material and on the other side an elongated, thin beam of light having means for moving the beam of light across the image and the photosensitive material. As the beam of light moves progressively across the image and the photosensitive material, it projects a thin blade of light on the image and the photosensitive material behind it, thereby exposing the photosensitive material as determined by the image. Means is also provided for moving one of the image or photosensitive material support means simultaneously with the beam of light to create a modification of the image on the photosensitive material as it is exposed. This novel concept of moving the thin beam of light to project the thin blade of light on the image and the photosensitive material behind it makes it possible to construct the apparatus in an extremely small, compact unit that is not complicated and that can be easily operated. In fact, the complete apparatus is selfcontained and essentially portable, much like a suitcase.

In the preferred form of my invention, a cabinet is provided with an opening over which is mounted a transparent support. Mounted in the cabinet is a movable light source from which is projectd a thin blade of light which is adapted to move progressively across the opening and progressively it projects the blade of light through the transparent support. Mounted on the outside of the support is a means for supporting a second supporting means or carrier that overlies the first support means. Means are provided for causing relative motion between the two support means, such motion being simultaneous with the movement of the light beam across the opening. An image is mounted on one of the support means and a photosensitive material on the other of the support means. Therefore, as the light beam moves across the opening and relative movement between the image and the photosensitive material is produced and the photosensitive material is exposed by the moving blade of light, the image captured on the photosensitive material will be modified from the original image.

In accordance with the preferred form of this invention, the beam or blade of light moving across the opening is produced by an elongated fluorescent light bulb mounted in a housing having a slit facing the opening. Thus, a blade of light is projected through the slit through the opening of the cabinet. The housing for the light bulb is mounted at each end by guide means which guide the housing and thus the beam of light for movement across the opening. Also within the preferred embodiment of this invention, the outer transparent support means supports the photosensitive material while the transparent support means that covers the opening supports the image. Further, the outer transparent support means for the photosensitive material is movable while the inner support means for the image is stationary.

The preferred means for moving the supporting means for the photosensitive material simultaneously with the light beam includes a means for operationally interconnecting the moving light beam with the support means either electrically or mechanically. I prefer it be accomplished by extending a cam follower means from the light beam housing through the front of the cabinet and engaging the cam follower means on a cam surface associated with the support means for the photosensitive material. Accordingly, depending upon the shape of the cam means, which can be modified as will be disclosed hereinafter, as the housing for the light beam moves across the opening of the cabinet, it engages the cam surfaces causing the photosensitive material to move in a predetermined pattern.

These and other objects, advantages and features of the present invention will be more fully understood and appreciated by reference to the written specification and the appended drawings.

BRIEF DESCRIPTION OF THE DRAWINGS

FIG. 3 is a vertical section of the device of FIG. 1 taken along the line III—III of FIG. 2 showing the back panel in section;

FIG. 4 is a front elevation of the image modifying machine of the present invention illustrating its use;

FIG. 6 is a plan view of two alternative movable support members or carriers;

FIG. 8 is a representation of the original of a word image and three modified reproductions thereof made by this invention.

DESCRIPTION OF THE PREFERRED EMBODIMENT

Figure 1:
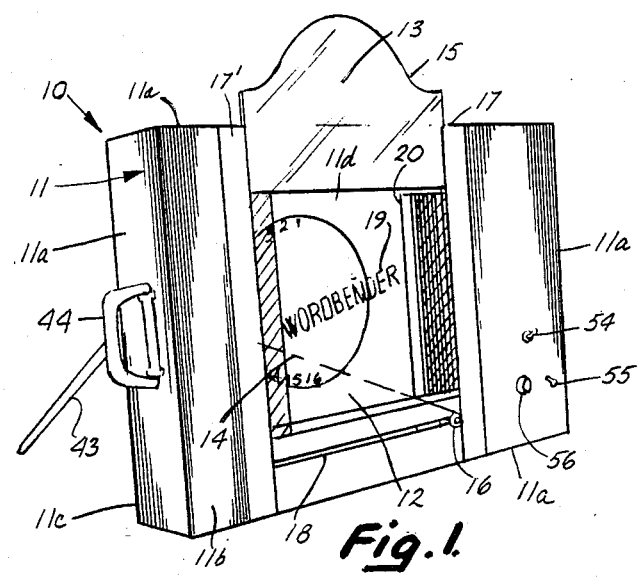
FIG. 1 is a perspective view of an image modifying machine of the present invention.

The present invention comprises a cabinet 11 having an opening 11d with a window 12. A movable support member or carrier 13 overlies the window 12 and is vertically movable within the guide members 17 and 17' (FIGS. 1 and 3). Window 12 has two blacked out areas 12a, 12b along its two vertical edges for reasons which will become apparent. Inside the cabinet is a movable light source 20 which directs light in the form of a thin blade through the window 12 and the transparent carrier 13. Mounted on the window is the image 19 and mounted on the carrier 13 is a sheet of photosensitive material. As will be explained hereinafter, the blade of light from the light source 20 progressively shines onto the image and the photosensitive material causing the material to be exposed. While the blade of light is moving across the image and the photosensitive material, the material is moved by reason of a cam follower 16 extending forwardly of the cabinet, as will be explained in greater detail hereinafter.

Referring specifically to the details of the various elements briefly described above, the cabinet 11 includes the slides 11a, a removable back 11c and a front 11b having an opening 11d therethrough in which the transparent panel or window 12 is provided. As previously set forth, panel or window 12 provides a support member for the image which as disclosed is the graphic WORDBENDER.

The carrier member 13 can take many different forms. As disclosed in FIG. 1, it is provided with one cammed edge 14 at the bottom edge as shown and a second cammed edge 15 at the top thereof. However, the cammed edge can take the forms disclosed in FIGS. 6 and 7 as will be discussed hereinafter. It is preferred that the carrier be constructed of a non-warpable material, such as plastic or glass, it being essential that it is transparent.

The movable light source 20 within the cabinet 10 includes a housing 21 containing an elongated fluorescent light 29. The light on the housing is arranged vertically within the cabinet 10 and is movable across the opening 11d from the position shown in FIG. 1 along one vertical edge of the opening to a second position along the other vertical edge of the opening 11d. Many different means can be provided for driving light source 20 across the opening 11d. I disclose a screw and nut arrangement as best disclosed in FIG. 2. Although this screw and nut arrangement works satisfactorily, I have discovered that the threads of the screw and the nut are required to be of very close tolerances. Accordingly, I contemplate a pulley arrangement in which the top and bottom ends of the light housing 20 are guided by rods may be more desirable from an economic standpoint.

Figure 5A:
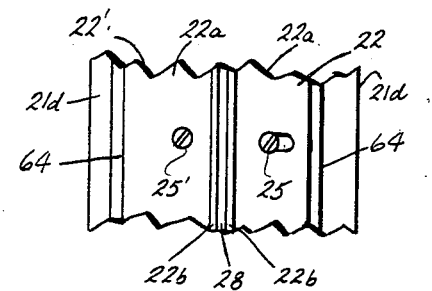
FIG. 5A is a fragmentary view of the light source housing illustrating the means for adjusting the width of the light beam projected thereby.
Figure 5:
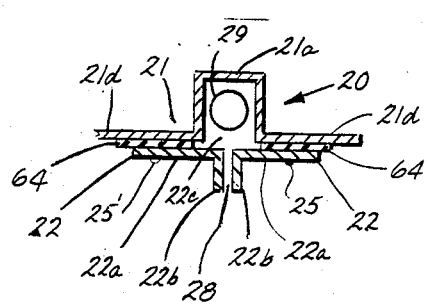
FIG. 5 is a cross-sectional view taken along the plane V—V of FIG. 4 showing some of the details of the light housing of the present invention.

FIGS. 4, 5, and 5A disclose the details of the light source 20. Housing 21 is formed to provide a compartment 21a for receiving and mounting the elongated fluorescent light 29 extending substantially the entire length of the compartment 21a. The compartment 21a has an opening 21c through which the light shines and over which a pair of aluminum angles 22 are mounted to provide the slit 28 therebetween. The two angles each have the flange 22a secured to the flange 21d of the compartment 21a and the flange 22b extending perpendicularly therefrom and between which is formed the slit 28. Between flanges 22a and 21d are gaskets 64 made from a resilient material. Gaskets 64 ensure that light shines only through slit 28 and not between flanges 22a and 21d thereby overexposing the photosensitive material. The angles 22 are secured to the flange 21d by the screws 25. As noted in FIG. 5A, the openings 26 through which the screws 25 extend are elongated permitting the width of the slit 28 to be adjusted as desired. As should be evident from the above description, the light shining through the slit 28 from the bulb 29 provides the thin blade of highly directional light and forms the light source which sweeps across the opening 11d of the cabinet 10. As disclosed in FIG. 2, a transformer 27 is mounted on the back of the light housing 21 for generating the necessary voltage for the fluorescent light 29. The rear of light housing 20 has an opening 21e with a light safe red filter 21f covering said opening. This illuminates the inside of machine for ease of operation in a dark room.

Figure 2:
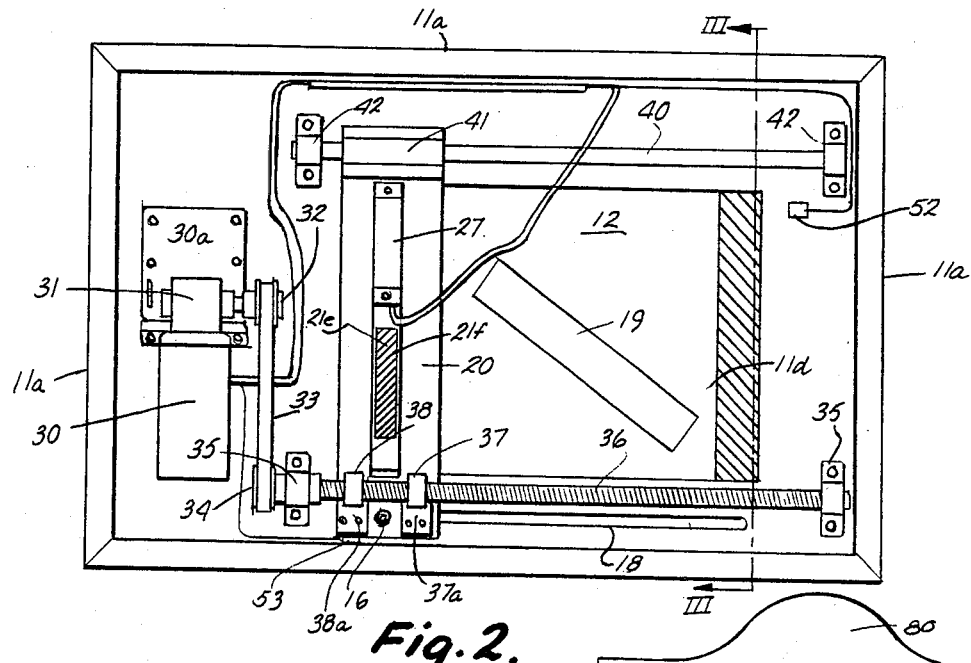
FIG. 2 is a rear elevation of the image modifying machine of FIG. 1 with the rear panel removed.

As disclosed in FIGS. 2 and 3, a motor 30 mounted on the back of front wall 11b by means of a motor mount 30a and provided with a gear reducer 31 is operably connected to a threaded rod 36 by means of a pulley 32, a belt 33 and a pulley 34. Pulley 32 is fixedly secured to a shaft from gear reducer 31 and pullet 34 being fixedly secured to one end of threaded rod 36.

Threaded rod or screw 36 is disposed along the lower edge of opening 11*d* and is fixedly secured to the back of front wall 11*b* by means of bearings 35. Bearings 35 allow rotational movement of threaded rod 36 about its longitudinal axis but prevent lateral displacement or rod 36 in cabinet 11.

A pair of threaded rod followers or nuts 37, 38 are received on threaded rod 36 and are fixedly attached to light housing 21 by means of brackets 37*a*, 38*a*. Therefore, when motor 30 is activated, threaded rod 36 will rotate by means of pulleys 32, 34 and belt 33 thereby rotating threaded rod 36 within rod followers 37, 38 forcing light housing 20 to move laterally across opening 11*d*.

Light housing 20 is operably secured at only one end to threaded rod 36 as can be seen in FIG. 3. So as to facilitate smooth movement of light source 20 across opening 11*d*, a guide rod 40 is disposed along the upper, horizontal edge of opening 11*d*. A bearing 41, preferably a Thompson bearing, having a bore therethrough is fixedly secured to the upper end of light housing 20, receiving guide rod 40 through said bore. Guide rod 40 is prevented from lateral movement within cabinet 11 by means of guide rod brackets 42. Therefore, as light source 20 is forced across opening 11*d*, the upper end of light housing 20 will glide along guide rod 40.

As shown in FIGS. 1, 2, and 3, cam follower 16 is fixedly secured to the lower end of light housing 21 and projects through cam follower slot 18 on cabinet 11. Therefore, as light housing 21 is forced across opening 11*d*, cam follower 16 will be forced from one end of cam follower slot 18 to the other. In addition, carrier 13 shown in FIG. 1 will move downwardly under the force of gravity between guides 17, 17', carrier 13 being supported in its vertical position only by angled cammed edge 14. Of course, it is to be understood that if parabolic cammed edge 15 were used by reversing the vertical orientation of carrier 13, carrier 13 would move first upwardly and downwardly as cam 16 moved across the machine in cam slot 18 and as cammed edge 15 followed cam 16.

As will be explained below, once the machine is turned on by switch 55, the light 29 remains on. Black out areas 12*a*, 12*b* on window 12 shown simply in cross hatch in FIGS. 1 and 3 for the sake of clarity are provided along the two vertical edges of carrier 12 to prevent the light shining through slit 28 from overexposing the photosensitive material on carrier 13 when light housing 20 is not moving across the transparent area of carrier 12. When light housing 20 is not moving, slit 28 is behind either black out area 12*a* or 12*b*, in other words. As shown in FIG. 3, slit 28 and flanges 22*b* are spaced closely behind window 12 so that the directional light shining through slit 28 does not expose the photosensitive material when the slit is behind either of the black out areas.

OPERATION

To obtain a modified graphic or image, a negative or positive of the image 19 is secured to panel 12 by means of glue, tape or the like as shown in FIG. 1. A photosensitive material is then mounted on a carrier 13 having a desired cammed edge 14 or 15. Carrier 13 is then placed between guides 17, 17' being held between the guides by the tilting of machine 10 against supports 43. Of course, as mentioned above, carrier 13 is also held in its vertical position by cam follower 16.

The light is turned on by on/off toggle switch 55. Toggle switch 54 is actuated, activating movement of the light housing 20 and causing light housing 20 and cam follower 16 to move across opening 11*d* exposing the photosensitive material on carrier 13 except for the areas of the photosensitive material shaded by image 19. As cam follower 16 moves across slot 18, cammed edge 14 (assuming that that edge is used) follows cam follower 16 thereby causing carrier 13 to move synchronously with light housing 20. As will be explained in more detail below, the modification of the image projected on the photosensitive material on carrier 13 produced by machine 10 will depend upon the orientation of the image 19 on carrier 12 as well as the configuration of the cammed edge of carrier 13. At this point, it should be apparent to one skilled in the art that a modification of image 19 will be captured on the photosensitive material (not shown) in carrier 13 due to the relative movement of the light housing 20 (and the light therein) with respect to carriers 12 and 13 and the relative movement of carrier 13 with respect to carrier 12.

The light is turned on by on/off toggle switch 55. Toggle switch 54 is moved from its second position to its first position, activating the movement of light housing 20 causing light housing 20 and cam follower 16 to move from behind blacked out area 12*a* across opening 11*d* exposing the photosensitive material on carrier 13 except for the areas of the photosensitive material shaded by image 19. As cam follower 16 moves across slot 18, cammed edge 14 (assuming that the edge is used) follows cam follower 16 thereby causing carrier 13 to move simultaneously with light housing 20. As will be explained in more detail below, the modification of the image projected on the photosensitive material and carrier 13 produced by machine time will depend upon the orientation of the image 19 on the carrier 12 as well as the configuration of the cammed edge of carrier 13. At this point, it should be apparent to one skilled in the art that a modification of image 19 will be captured on the photosensitive material (not shown) on carrier 13 due to the relative movement of light housing 20 (and the light therein) with respect to carriers 12 and 13 and the relative movement of carrier 13 with respect to carrier 12. When light housing 20 travels behind blacked out area 12*b* to the other vertical edge of opening 11*d* opposite the light housing's original position shown in FIGS. 1 and 3, it activates a switch 52 as indicated above causing the light housing to stop in this second position. The light remains on, however.

A different image can then be placed on window 12 and new photosensitive material can be secured to carrier 13, and the machine can be put through a reverse cycle by moving toggle switch 54 toward its second position causing light housing 20 to move from the second position to its first, original position, shown in FIGS. 1 and 3. If the same image 19 is used in the reverse cycle as was used in the forward cycle, the same modification of image 19 will be captured on the photosensitive material in reverse cycle as in the forward cycle provided the same cammed edge on carrier 13 is used and provided that the position of image 19 on carrier 12 is not changed.

The degree of exposure of the photosensitive material will depend upon the speed of light housing 20 across opening 11*d* as well as the width of slit 21 in housing 20. The speed of light housing 20 is controlled by rheostat switch 56. This switch, of course, adjusts the current available to motor 30 thereby adjusting the speed of motor 30.

DETERMINATION OF MODIFICATION

As disclosed above and shown in FIG. 6, carrier 13 can have a variety of cammed edges thereon. The cammed edge can be a rounded edge 80, or an angled edge 81. In addition, a sinusoidal 82 or a wavy edge 83 are possible.

Figure 7:
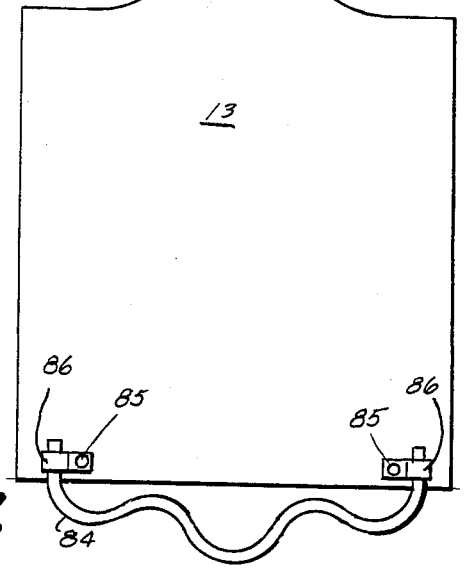
FIG. 7 is a plan view of a third alternative negative carrier having a bendable cammed edge thereon.

As shown in FIG. 7, a bendable bar 84 can be provided on a carrier 13. In this modification, bar 84 is preferably made from a material such as lead coated with plastic which holds its shape upon bending such that a plurality of different cammed edge configurations can be achieved from the same cammed edge. On the other hand, bar 84 could be permanently shaped and replaceable by other differently shaped bars. Bar 84 is secured to a carrier 13 by means of bolts 85 and clamps 86, as shown in FIG. 7. No matter what cammed edge is used, machine 10 operates in basically the same fashion; only the type of modification achieved is changed.

Each cammed edge can be assigned a designation, with a letter. For example, the rounded edge 80 can be assigned a letter A; the angled edge 81 can be assigned two letters B and C in view of the fact that it is reversible and produces two different modifications depending upon which side is laid downward on carrier 12. Note that as shown in FIG. 5, the letter C is backward to reflect the fact that edge C requires carrier 12 to be mounted on the opposite surface from edge B when carrier 13 is mounted on carrier 12 between guides 17.

Within narrower aspects of my invention, as shown in FIGS. 1 and 4, a position chart 70 is conveniently provided and mounted on back panel 11c inside cabinet 11. Chart 70 is aligned on back 11c such that it is visible through opening 11d, panel 12 and carrier 13. Position chart 70 has a plurality of position lines 71 numbered for convenience in FIGS. 1 and 4 from 1 to 16. Each number corresponds to a different position at which line 71 intersects the center of position chart 70. With the position chart 70 and a plurality of carriers, each having a different configured cammed edge, it is possible for a manufacturer to specify for the user what type of modification will result depending upon the orientation of image 19 on carrier 12 and on the configuration of the cammed edge.

For an example of the use of chart 70, the word WORDBENDER shown in phantom lines in FIG. 4 is mounted on carrier 12 such that it is parallel to position line 71 numbered 4. The photosensitive material is mounted on a carrier 13 having an angled edge designated C, shown in FIG. 8. When the machine is activated and put through its cycle, light housing 20 and the light therein will move across opening 11d and carrier 13 will move upwardly as it follows cam follower 16 on cammed edge C. This causes a condensing of the length of the word WORDBENDER as it is projected on the photosensitive material on carrier 13. It also causes an increase in height of the letters of the word. Therefore, it is possible to designate this type of modification as 5C corresponding to position line 5 on position chart 70 and to cammed edge C. A comparison of the original of the word WORDBENDER and a modification 5C is shown in FIG. 8.

Another example is to align image 19, i.e., the word WORDBENDER, with position line 71 numbered 13 in FIGS. 1 and 4 and mount the photosensitive material on a carrier 13 using the angled edge designated C shown in FIG. 6. When cycled through the machine as described above, the word WORDBENDER will be expanded in length and condensed in height due to the relative movement of housing 20 (and the light therein) with respect to both carriers 12 and 13, and due to the movement of carrier 13 with respect to the stationary panel 12. The modification achieved by position 13C is shown in FIG. 8 and again corresponds to the position of the word WORDBENDER parallel to position line 13 using cammed edge C on the movable carrier 13.

It is also possible for a manufacturer to provide for the user an indication of what types of modifications will be achieved by using cammed edges having different configurations from the cammed edge C described above. For instance, when the word WORDBENDER is mounted on carrier 12 aligned with position line 9 on position chart 70 and a carrier 13 is used with cammed edge designated A in FIGS. 5 and 7, the word WORDBENDER will be curved as shown by 9A in FIG. 8.

It is therefore possible to compile in booklet form what modifications will be achieved by the orientation of image 19 on carrier 12 and by the type of cammed edge on carrier 13. Such a booklet is an extremely useful owner's manual.

As will become apparent, it is not necessary that position chart 70 be round and have position lines 71 which intersect the center of the round position chart. Other types of position charts are possible. The position chart 70 shown in FIGS. 1 and 5 is merely an illustration.

The unit described herein can conveniently be provided with a handle 44 for carrying the machine like a suitcase. A prototype has been constructed and is about as large as a large suitcase and is easily carried. The cabinet can be injection molded from lightweight plastic inexpensively. The size and weight of the machine makes it easy to transport from one job to another and to store when not in use.

It is apparent that any means for moving the light source and the housing relative to a first carrier 12 and a second carrier 13 can be used. It is also apparent that other means equivalent to cam follower 16 and cammed edges on carrier 12 can be used for moving a one carrier relative to the other. As long as the movement of the one carrier relative to the other is simultaneous with the movement of the light source relative to the carriers, a modified graphics machine can be produced consistent with the teachings of the present invention.

Of course, it is understood that the above is merely a preferred embodiment of the invention and that various changes and alterations may be made without departing from the spirit and broader aspects of the invention.

The embodiments of the invention in which an exclusive property or privilege is claimed are defined as follows:

1. A photographic modifier for photographically modifying images such as graphics and the like, comprising:
   a stationary transparent support surface for supporting an image;
   a movable support surface overlaying on one side of said stationary support surface for supporting photosensitive material;
   a light housing on the other side of said stationary supporting surface, with a light therein and means for producing a narrow, thin highly directional elongated beam of light and directing said beam toward said two support surfaces;

motive power means for moving said beam of light across said stationary and movable support surfaces for progressively projecting a narrow, thin blade of light on said image and the photosensitive material behind it as said light sweeps across said image thereby exposing said pohntosensitive material as determined by said image; and means for moving said movable surface simultaneously with said beam of light to create a modification of said image on said photosensitive material.

2. The device as recited in claim 1 in which there is an operative connection between said movable light means and second support surface providing said means for moving said second support surface.

3. The device as recited in claim 2 wherein said operative connection includes at least one cammed edge on said second support surface and a cam follower fixedly secured to said light means, which cam follower engages one of said cammed edges of said second support surface, said cam follower movable with said light means thereby moving said second support surface by means of said cammed edge being biased against said cam follower.

4. The device as recited in claim 3 wherein said light means comprises an elongated housing, a light disposed in said housing, said housing having a narrow slit for projecting said narrow, thin, elongated beam of light, and wherein said means for supporting said light means and said housing includes guide means disposed at each end of said housing for guiding said housing as said light sweeps across said image.

5. The device as recited in claim 4 wherein said guide means comprises two elongate guide rods, one at each end of said housing, each rod being generally perpendicular to said housing and a rod follower fixedly secured to each end of said housing, each rod follower being slidably received by one of said guide rods, said rod followers following on said guide rods as said housing and said light sweep across said image whereby said housing is guided across said first and second support surface.

6. The device as recited in claim 5 wherein said motive power means comprises: one of said guide rods being threaded, the rod follower slidably received by said threaded guide rod having a threaded bore therethrough, said threaded rod follower being threadably received by said threaded guide rod, motor means operably connected to said rod so as to effect rotation of said rod about its longitudinal axis, said threaded rod follower moving along said threaded rod as said rod is axially rotated whereby said housing will move across said first and second support surface.

7. The device as recited in claim 3 wherein a plurality of interchangeable second support surfaces are provided, each having a cammed edge with a different edge configuration from cammed edges on said other second support surfaces whereby different modifications can be achieved by selecting a different second carrier having a different cammed edge.

8. The device as recited in claim 3 wherein said second support has a cammed edge made from a bendable material which holds its bend upon bending whereby a plurality of different edge configurations can be achieved from the same cammed edge.

9. The device as recited in claim 3 which further comprises a position chart disposed behind said housing and said first support surface, said position chart having a plurality of position indicators thereon whereby said image to be modified can be mounted on said first support surface aligned with one of said position indicators to achieve a predetermined degree of modification of said image on said photosensitive material.

10. The device as recited in claim 9 wherein a plurality of interchangeable second support surfaces are provided, each having at least one cammed edge thereon with a different configuration from cammed edges on said other second support surface, each cammed edge being assigned a designation whereby mounting said image on said first support surface in alignment with a specified position indicator and mounting said photosensitive material on a second support having a specified designation provides a predetermined type of modification.

11. The device as recited in claim 1 which further comprises a position chart disposed behind said beam of light said position charge having a plurality of position indicators thereon whereby said image to be distorted can be mounted on said first support surface aligned with one of said position indicators to achieve a predetermined degree of modification of said image on said photosensitive material.

12. The device as recited in claim 11 wherein a plurality of interchangeable second support surfaces are provided, having at least one cammed edge thereon different from cammed edges on said other second support surface, each cammed edge being assigned a designation whereby mounting said image on said first support surface in alignment with a specified position indicator and mounting said photosensitive material on a second support having a specified designation provides a predetermined type of modification.

13. The device as recited in claim 1 wherein said means for producing a highly directional elongated beam of light includes a narrow slit through said housing and further including a pair of parallel slit forming members which have parallel, closely positioned walls between which light shines, said walls reducing light scatter and creating said highly directional, narrow beam of light.

14. The device as recited in claim 13 which further includes a cabinet with opening through one face thereof, said stationary support surface being located across said opening, said light housing located within said cabinet, said cabinet including guide means for guiding the movement of said movable support surface over said first support surface.

15. A method of photographically modifying images such as graphics and the like comprising:

providing a stationary transparent support surface;

providing a movable support surface overlaying said movable support surface on one side of said stationary support surface;

mounting an image to be distorted overlaying said stationary support surface and mounting photosensitive material overlaying said movable support surface;

providing means on the other side of said stationary support surface for supporting and producing a highly directional elongated, narrow, thin beam of light, and moving said beam laterally across said stationary support surface with the light beam shining through said stationary support surface toward said image and photosensitive material; and moving said second support surface across said first support surface simultaneously with said beam of light to create a modification of said image on said photosensitive material as said photosensitive material is exposed to said light.

16. The method of claim 15 wherein the movement of said movable support surface is in a direction generally longitudinally of said elongated beam of light.

17. The method as recited in claim 15 which further comprises providing a position chart and locating it behind said light beam, said position chart having a plurality of position indicators thereon, mounting said image on said first support surface in alignment with one of said position indicators whereby a predetermined degree of modification of said image on said photosensitive material can be effected.

18. The method as recited in claim 17 wherein a plurality of interchangeable second support surfaces are provided, each interchangeable with one another and having at least one cammed edge thereon different from cammed edges on said other second support surface, assigning said cammed edge a designation and mounting said image on said first support surface in alignment with a specified position indicator and mounting said photosensitive material on said second support surface having a specified designation whereby a predetermined type of modification is achieved.

19. The method of claim 15 wherein said directional beam of light is produced by positioning a light source in a housing with an elongated slit therethrough, positioning parallel wall-like members on either side of said slit, and shining said light through said slit and between said wall members toward said two supports, said wall members minimizing scatter of light at angles acute to the sides of said slit.

20. An apparatus for photographically modifying images including:
   a cabinet with an opening therethrough;
   a stationary transparent support surface disposed over and across said opening for supporting an image to be distorted;
   a light housing located inside said cabinet with a light therein, and an elongated slit therethrough oriented toward said stationary support surface, said light housing having a parallel wall member on each side of said slit spaced close to the other wall member to generate highly directional light, said wall members and slit being substantially free of direct contact with said first support surface;
   a movable support surface disposed overlaying said stationary support surface for supporting photosensitive material;
   means for operatively connecting and moving said light housing and movable support surface in tandem; and
   means for guiding the movement of said light housing and movable support means.

* * * * *